US010657271B2

United States Patent
Doyle et al.

(10) Patent No.: US 10,657,271 B2
(45) Date of Patent: May 19, 2020

(54) VERIFICATION TECHNIQUES FOR ENHANCED SECURITY

(71) Applicant: International Business Machines Corporation, Armonk, NY (US)

(72) Inventors: Matthew S. Doyle, Chatfield, MN (US); Joseph Kuczynski, North Port, FL (US); Kevin A. Splittstoesser, Stewartville, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 14/704,035

(22) Filed: May 5, 2015

(65) Prior Publication Data
US 2016/0328568 A1    Nov. 10, 2016

(51) Int. Cl.
| | | |
|---|---|---|
| G01N 33/48 | (2006.01) | |
| G06F 21/62 | (2013.01) | |
| H04L 29/06 | (2006.01) | |
| G07C 9/00 | (2020.01) | |
| G06F 21/32 | (2013.01) | |
| G01N 35/00 | (2006.01) | |

(52) U.S. Cl.
CPC ....... *G06F 21/62* (2013.01); *G01N 35/00732* (2013.01); *G06F 21/32* (2013.01); *G06F 21/6218* (2013.01); *G07C 9/00* (2013.01); *H04L 63/105* (2013.01); *H04L 63/12* (2013.01); *H04L 63/1408* (2013.01); *H04L 63/1416* (2013.01); *G01N 2035/00841* (2013.01); *G01N 2035/00851* (2013.01)

(58) Field of Classification Search
None
See application file for complete search history.

(56) References Cited

U.S. PATENT DOCUMENTS 6,422,061 B1 *  7/2002  Sunshine ............. G01N 29/022
                                                340/603
8,237,576 B2 *  8/2012  Wander ............... E02D 29/1427
                                                340/632
2009/0104074 A1 *  4/2009  Bodlaender ............. B01L 3/508
                                                422/50
2009/0259588 A1    10/2009  Lindsay
2013/0284610 A1 * 10/2013  Wilsey ............... G01N 27/3272
                                                205/777.5
2013/0285477 A1 * 10/2013  Lo ........................... H02J 17/00
                                                307/151
2014/0030800 A1 *  1/2014  Moses ................... G01N 21/64
                                                435/288.7
2014/0289875 A1    9/2014  Knafel

OTHER PUBLICATIONS

Iskandarani, Mahmoud Z. "A Novel Odor Key Technique for Security Applications Using Electronic Nose System." American Journal of Applied Sciences 7.8 (2010): 1118-1122.*
Abdel-Aty-Zohdy, Hoda S. "Artificial neural network electronic nose for volatile organic compounds." In Proceedings of the 8th Great Lakes Symposium on VLSI (Cat. No. 98TB100222), pp. 122-125. IEEE, 1998.*
IPCOM000138504, IBM; "Sectional Document Security Enablement"; An IP.com Prior Art Database Technical Disclosure; http://ip.conn/IPCOM/000138504; Jul. 21, 2006.
IPCOM000189110; "Spatial amplification of information secrecy"; An IP.com Prior Art Database Technical Disclosure; http://ip.com/IPCOMM/000189110; Oct. 28, 2009.
Smith, Deborah, "Lab-on-a-Chip Device Overcomes Miniaturization Problems", viewed at (http://www.pddnet.com/news/2014/04/lab-chip-device-overcomes-miniaturizationproblems?et_cid=3913897&et_rid=281013647&type=cta), Apr. 30, 2014.
List of IBM Patents or Patent Applications Treated as Related.

* cited by examiner

*Primary Examiner* — Anna Skibinsky
(74) *Attorney, Agent, or Firm* — Patterson + Sheridan, LLP

(57) ABSTRACT

In an example, a method includes obtaining an expected biological sample value at a computing device. The expected biological sample value indicates an expected concentration of a material biologically processed by a courier. The computing device determines whether the measured biological sample value is associated with the courier based on a comparison of the expected biological sample value to the measured biological sample value. The method also includes determining a particular set of operations to be performed at the computing device based on a result of the comparison.

13 Claims, 7 Drawing Sheets

VERIFICATION TECHNIQUES FOR ENHANCED SECURITY

I. FIELD OF THE DISCLOSURE

The present disclosure relates generally to verification techniques for enhanced security.

II. BACKGROUND

In certain applications, highly sensitive algorithms, data, and/or other program elements are stored, developed, and housed within non-volatile memory elements. In certain other applications, hardware (e.g., the non-volatile memory elements), processing components, or other circuitry may be considered sensitive. There may be a concern that some sensitive elements (e.g., hardware or software) could be accessed and thus have their security compromised. In order to avoid data loss and/or security breaches, mechanisms may be employed to detect intrusion attempts or to otherwise increase a level of difficulty associated with unauthorized access.

Although sensitive elements may be housed in a secure (and possibly guarded) facility during use, spare parts, prototype parts, parts to be repaired, etc. may be stored and transported in less secure locations. Accordingly, storage and transport of such secure elements presents particular challenges.

III. SUMMARY OF THE DISCLOSURE

According to an embodiment, a method includes obtaining an expected biological sample value at a computing device (e.g., reading from a memory of the computing device, receiving via input at the computing device, or calculated at the computing device). The expected biological sample value indicates an expected concentration of a material biologically processed by a courier. The computing device determines whether the measured biological sample value is associated with the courier based on a comparison of the expected biological sample value to the measured biological sample value. The method also includes determining, at the computing device, a particular set of operations to be performed based on a result of the comparison.

According to another embodiment, a method includes obtaining, at a first computing device, an expected value to be measured for a second computing device (e.g., an expected concentration of a volatile material or an expected number of particle emissions). The method includes determining, at the first computing device, whether a measured value is associated with the second computing device based on a comparison of the expected value to the measured value. The method further includes determining, at the first computing device, a particular set of operations to be performed based on a result of the comparison.

According to another embodiment, an apparatus is disclosed. The apparatus includes a biological analysis component and a control component. The biological analysis component is configured to obtain an expected biological sample value. The expected biological sample value indicates an expected concentration of a material biologically processed by a courier. The biological analysis component is further configured to determine whether a measured biological sample value is associated with the courier based on a comparison of the expected biological sample value to the measured biological sample value. The control component is configured to perform a first set of operations based on the result of the comparison indicating that the measured biological sample value is associated with the courier. The control component is configured to perform a second set of operations based on the result of the comparison indicating that the measured biological sample value is outside an acceptable range of the biological sample value.

One advantage of the present disclosure is the ability to provide additional layer(s) of security when transporting sensitive hardware and/or sensitive data to a destination location (e.g., a secure location). In some cases, additional security may be provided by verifying an identity of a courier at a destination location by comparing a measured biological sample value to an expected biological sample value for the courier (e.g., based on a metabolic profile of the courier). Alternatively or additionally, hardware security may be enhanced by comparing a measured value (e.g., a measured volatile material concentration value or a measured number of particle emissions) to an expected value (e.g., when located within a particular range of a computing device that is configured to off-gas a volatile material or to emit particles, such as alpha particles).

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 4:
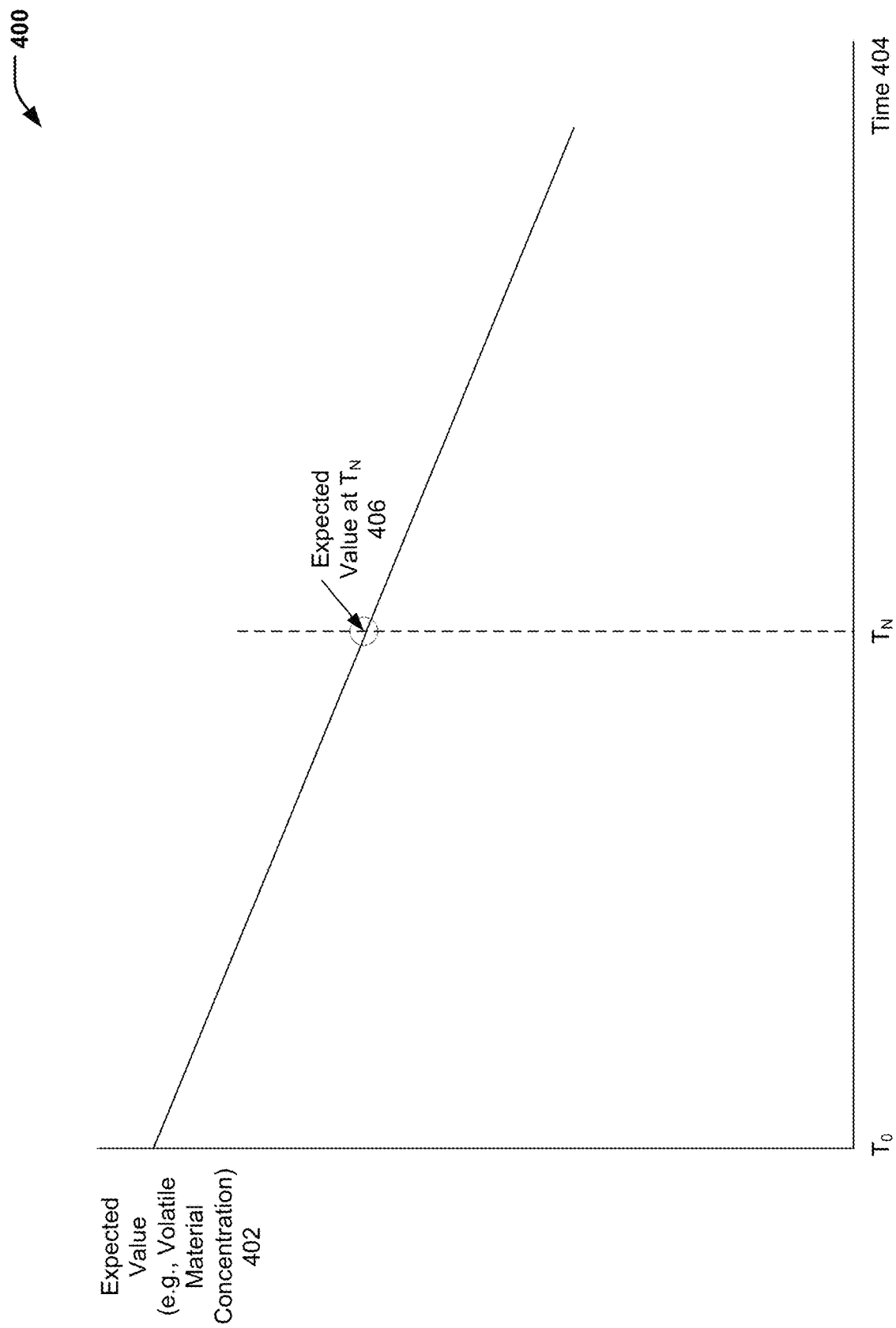
FIG. 4 is a diagram illustrating an example of expected volatile material concentration values over time for use in identity verification, according to a particular embodiment.
Figure 5:
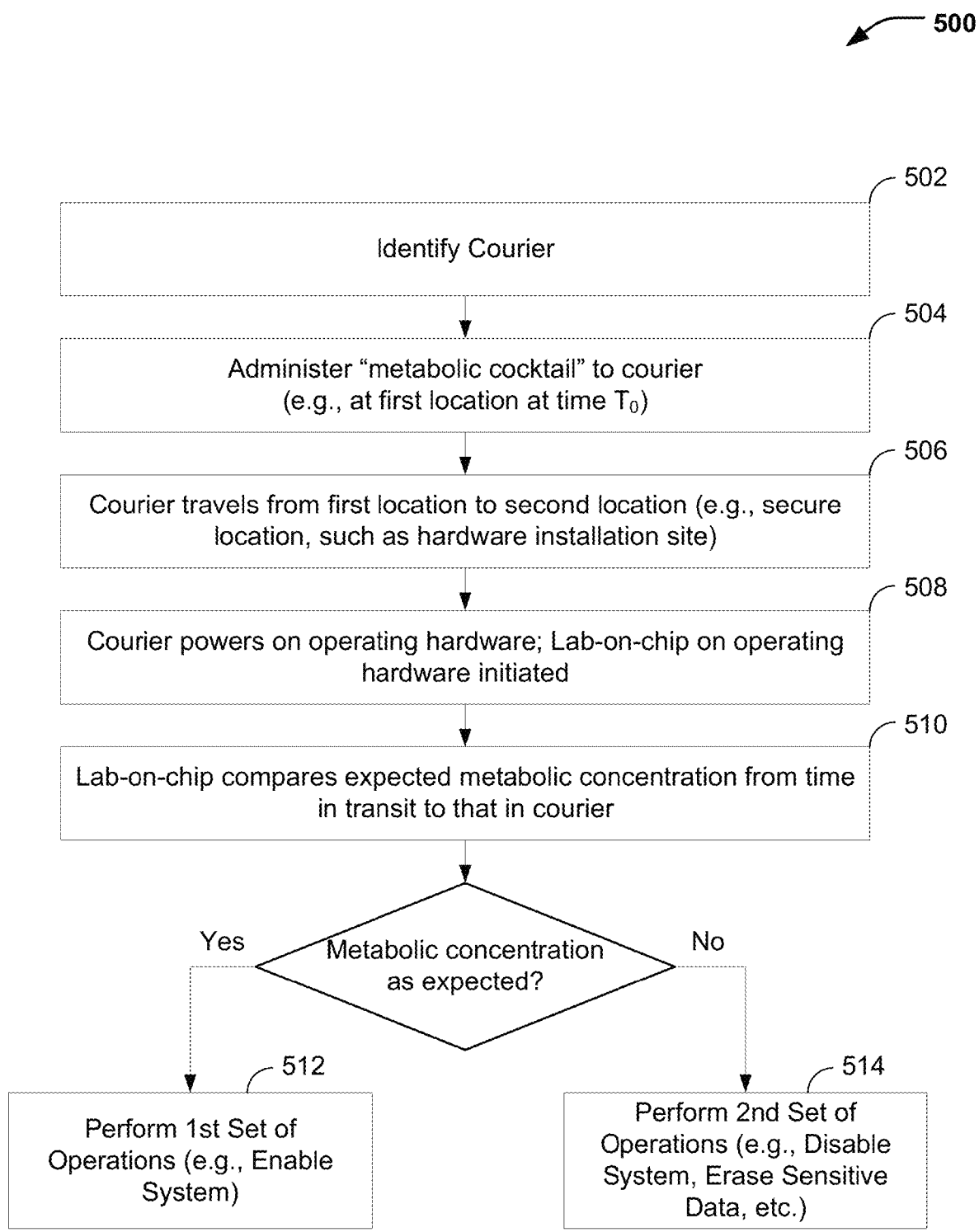
FIG. 5 is a flow diagram illustrating a particular embodiment of a method of identity verification based on a comparison of a measured biological sample value to an expected biological sample value for a courier.
Figure 6:
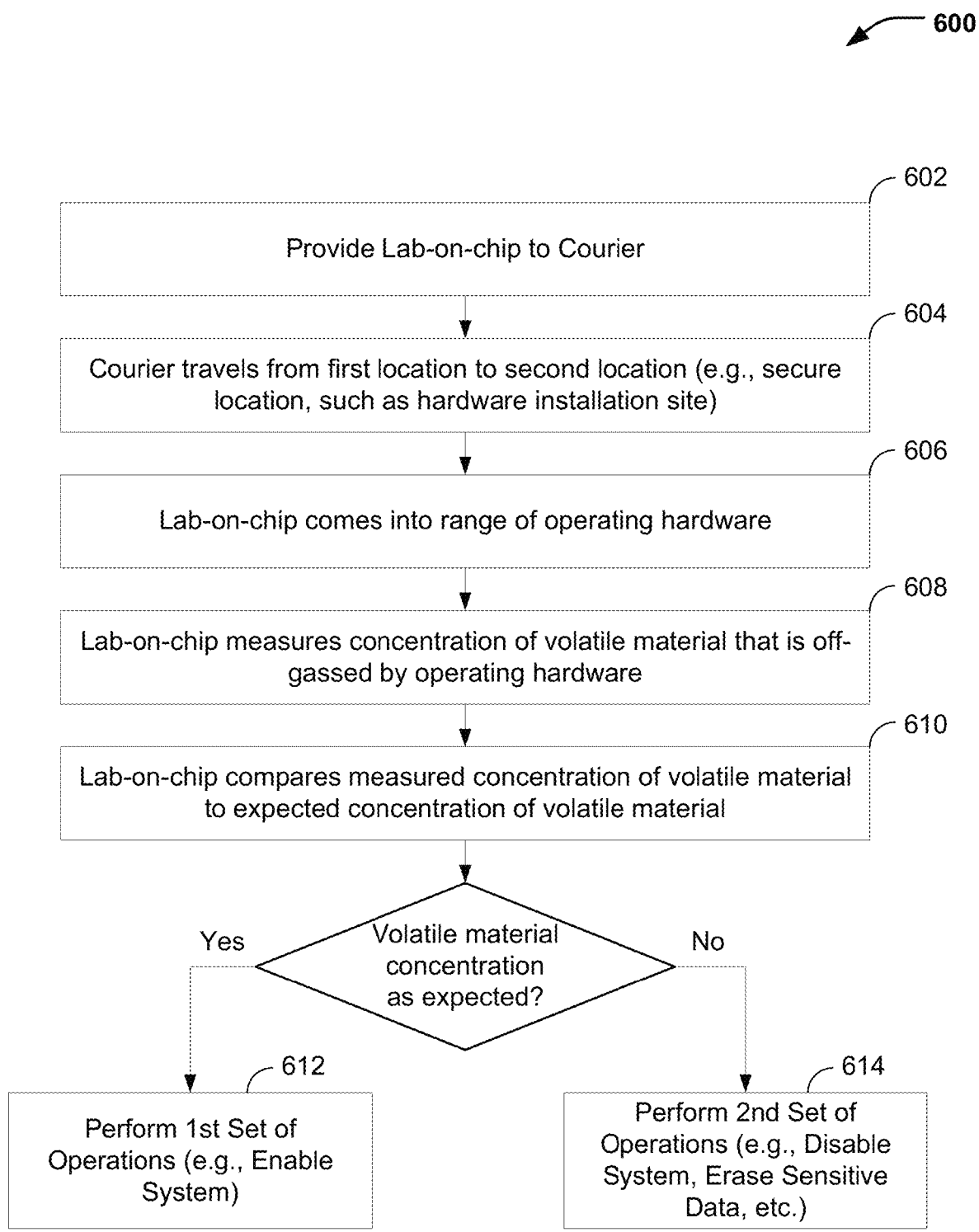
Figure 7:
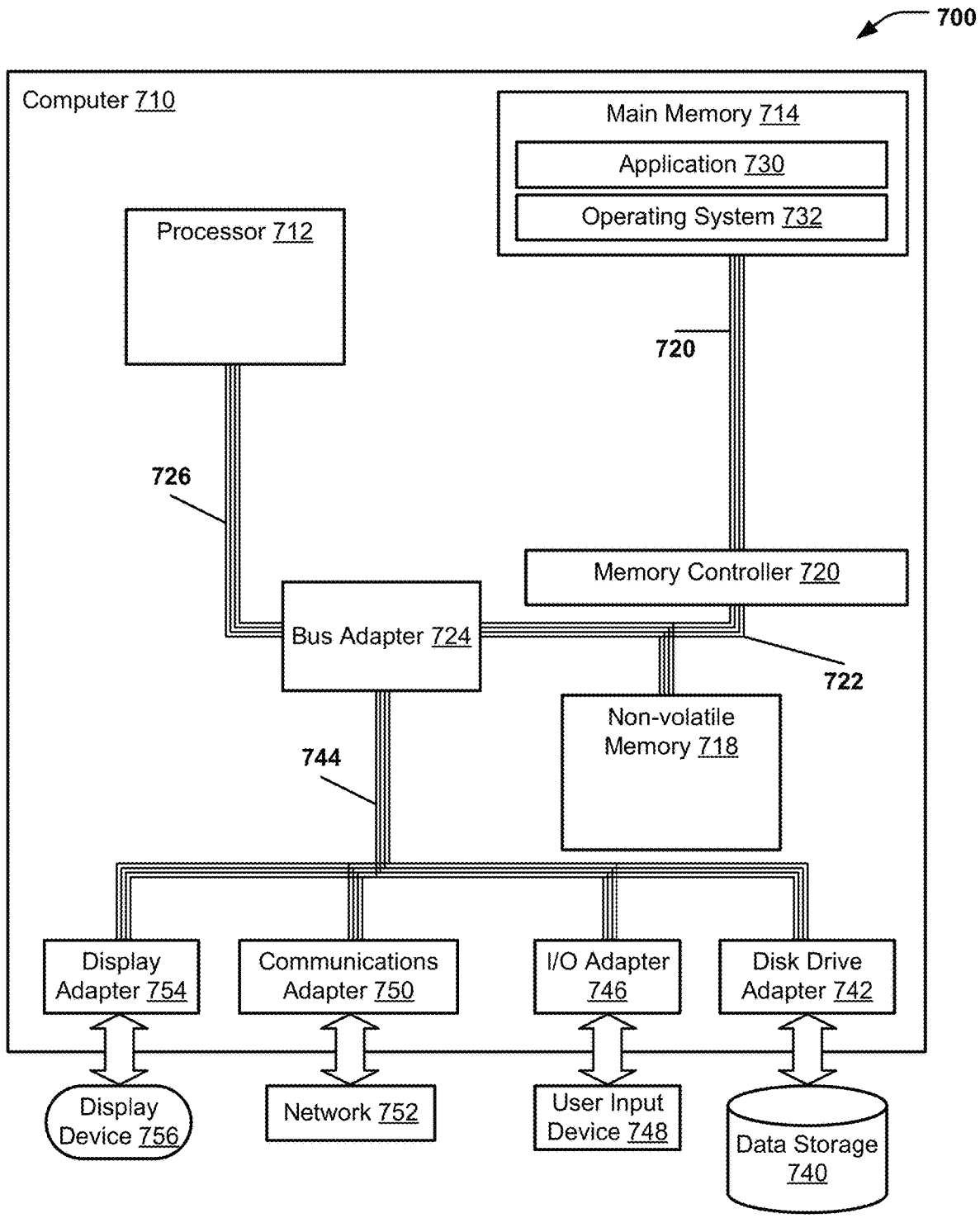

FIG. 6 is a flow diagram illustrating a particular embodiment of a method of identity verification based on a comparison of a measured value (e.g., a measured volatile material concentration value) to an expected value (e.g., a volatile material concentration value that is expected to be measured when located within a particular range of a computing device); and FIG. 7 is a block diagram of an exemplary computer system operable to support embodiments of computer-implemented methods, computer program products, and system components as illustrated in FIGS. 1-6.

V. DETAILED DESCRIPTION

The present disclosure relates to providing additional layer(s) of security when transporting sensitive hardware and/or sensitive data to a destination location (e.g., a secure location). Additional layer(s) of security may be appropriate in various contexts. For example, in the event that an electronic device with sensitive hardware components and/or sensitive data (e.g., commercial, industrial, or military devices) is intentionally or inadvertently obtained by an unauthorized party, the unauthorized party may have access to sensitive information.

In some cases, additional security may be provided by verifying an identity of an individual (referred to herein as a "courier") at a destination location by comparing a measured biological sample value to a biological sample value that is expected to be measured for the courier. As an example, using one or more materials (that are ingested or otherwise administered to the courier) along with the metabolic profile of the courier, a biological sample measurement device (e.g., a "lab-on-chip" device) may be utilized to verify an identity of the courier as well as an elapsed time since the material(s) were administered to the courier.

In a particular example, multiple "layers" of identity verification techniques may be utilized. For example, a biometric security device (e.g., a fingerprint scanner or retinal imager) may represent a first layer of security, an oximeter (e.g., to verify that the courier is alive) may represent a second layer of security, and the biological sample measurement device may represent a third layer of security. Sensitive data may be secure until the courier's identity is verified using each layer of security.

Numerous materials may be selected for administration to the courier (also referred to herein as "ingested" materials). For example, the courier may orally ingest the material (or multiple materials, referred to herein as a "metabolic cocktail"), or the material may be otherwise administered to the courier, such as via inhalation or absorption. Examples of ingested material(s) include glucose, asparagusic acid, erythropoietin (EPO), or a medical radioisotope, among other alternatives. Prior to transit, a baseline metabolic clearance window (also referred to herein as a "baseline metabolic profile") for the particular courier may be determined. For example, the rate at which the courier metabolizes one or more of the ingested materials may be determined and saved as the baseline for the courier. A material concentration may change due to various kinds of biological activity (e.g., chemical conversion or uptake), excretion (e.g., urination, exhalation, etc.). In some cases, the courier biologically processes an ingested material (e.g., glucose), and a concentration of another material (e.g., insulin) may be used. In other cases, the courier biologically processes an ingested material (e.g., erythropoietin (EPO) or a medical radioisotope) by excreting the same material.

Following ingestion of the material(s), the courier's body may begin biologically processing the material(s). The courier may follow a predetermined travel protocol to a destination site (e.g., a hardware installation site). At the hardware installation site, the courier submits to biological sampling (e.g., blood, urine, or breath) for comparison to an expected result (e.g., based on the baseline metabolic profile for the courier). In some cases, a lab-on-chip device may be used to analyze the biological sample and may compare a result to the expected result. If the results match (e.g., within an allowed error margin), access to sensitive hardware and/or sensitive data may be enabled. If the results do not match (e.g., within the allowed error margin), the sensitive hardware may be disabled, the sensitive data may be removed/erased, access to the sensitive data may be restricted, or a combination thereof (among other alternative operations to be performed in the event of a mismatch).

Alternatively or additionally, a lab-on-chip device may be transported by the courier. The lab-on-chip device may be "mated" to a specific sensitive hardware item (e.g., a blade server for use at a secure data center). In some cases, the specific sensitive hardware item may include one or more volatile materials (e.g., a volatile organic compound (VOC) or multiple VOCs) with known volatility information that may be used to determine expected volatile material concentration value(s) to be measured at particular times. Alternatively or additionally, in some cases, the specific sensitive hardware item may include one or more medical radioisotopes (e.g., alpha particle emitters) with known half-life information that may be used to determine expected particle emission value(s) to be measured at particular times (e.g., an expected number of alpha particle emissions). While the present disclosure describes examples of volatile material(s) being used for hardware identity verification, it will be appreciated that similar methods may be employed to verify a hardware item based on particle emission value(s), such as alpha particle emission value(s). Illustrative, non-limiting examples of alpha particle emitters used in nuclear medicine include 225 actinium (Ac) with a known half-life of 10.0 days, and 223 radium (Ra) with a known half-life of 11.435 days. Alternative and/or additional emissive material(s) or a combination of emissive materials may be used.

In the case of volatile materials, the sensitive hardware item may be configured to off-gas a specific compound (or mixture) that can be detected by the lab-on-chip device. This may be accomplished using various methods. As an example, an appropriate compound (or mixture) with known volatility may be selected. An off-gassing rate of the compound with known volatility may be kinetically controlled, and an elapsed transit time (of the courier or the sensitive hardware item) may be determined. Once the lab-on-chip device is within a particular range of the sensitive hardware item, the lab-on-chip device detects the volatile compound and a concentration of the volatile compound prior to providing the courier with access to the sensitive hardware item. If the lab-on-chip device does not detect the expected sensitive hardware item or does not detect the expected volatile compound/concentration, the lab-on-chip device may perform a set of operations. For example, the lab-on-chip device may render itself inoperative, render the sensitive hardware item inoperative, and/or disable/remove particular sensitive data, among other alternatives.

Figure 1:
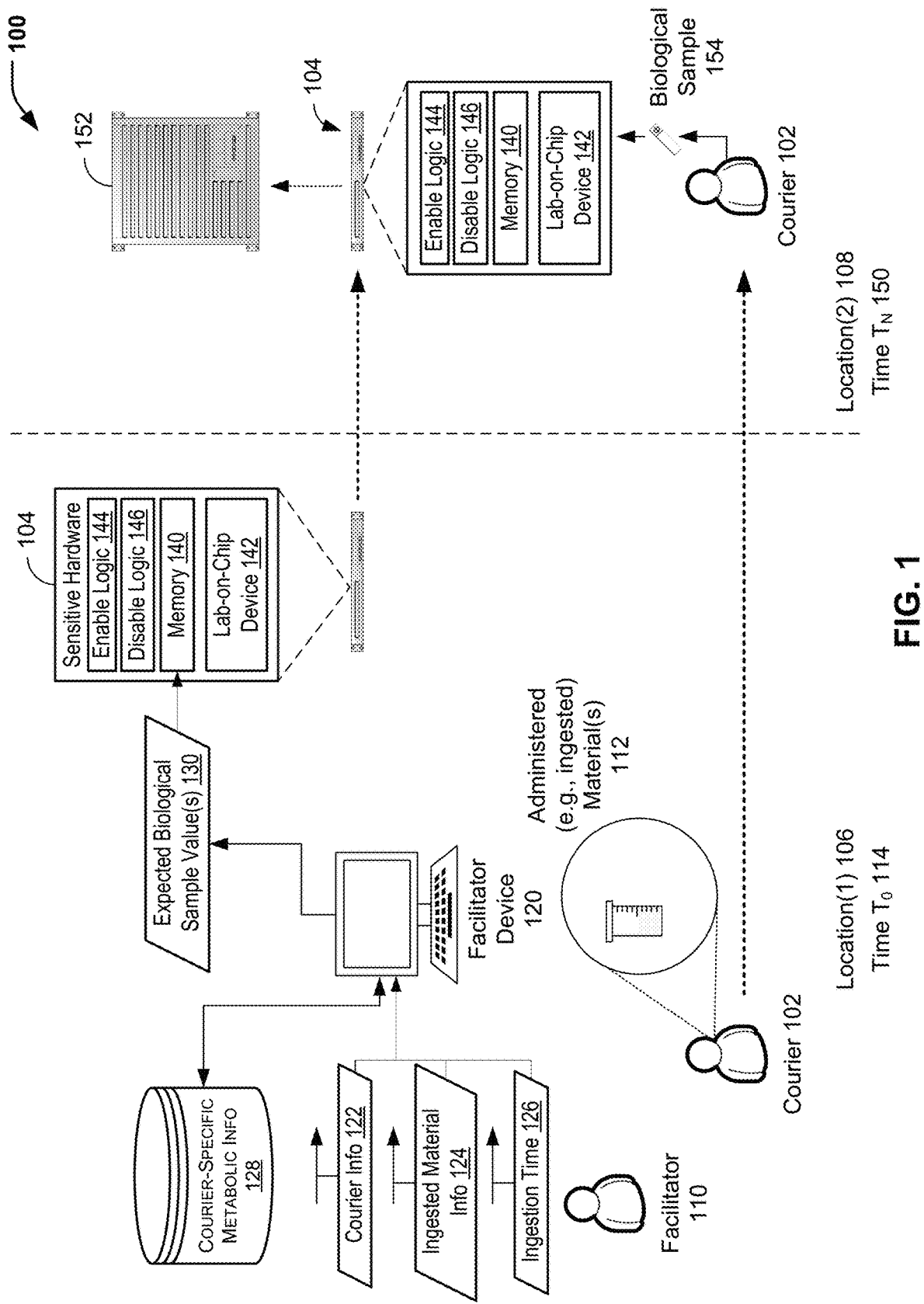
FIG. 1 is a block diagram illustrating an example of a system of identity verification based on a comparison of a measured biological sample value to an expected biological sample value for a courier, according to a particular embodiment.

Referring to FIG. 1, a block diagram of a particular embodiment of a system 100 of identity verification based on a comparison of a measured biological sample value to an expected biological sample value is illustrated and is generally designated 100. In the example of FIG. 1, a baseline metabolic profile for a courier 102 is determined for one or more ingested materials. After establishing the baseline metabolic profile, the courier 102 ingests a material (or multiple materials) at a particular time before travelling to a destination location. The baseline metabolic profile for the courier 102 may be used to determine a biological sample value that is expected to be measured for the courier 102 at a later time. An identity of the courier 102 may be verified based on a comparison of the expected biological sample value to a measured biological sample value. In some cases, a lab-on-chip device may be used to analyze a blood sample, a urine sample, or a breath sample for comparison to an expected biological sample value for the courier 102. In other cases, a device at the second location 108 may calculate the expected biological sample value for the courier 102 based on the baseline metabolic profile for the courier 102.

In the particular embodiment illustrated in FIG. 1, the system 100 includes a computing device 104 (identified as "Sensitive Hardware" in FIG. 1) to be transported from a first location 106 (identified as "Location(1)" in FIG. 1) to a second location 108 (identified as "Location(2)" in FIG. 1). In other cases, the computing device 104 may be transported from another location to the second location 108. A facilitator 110 (e.g., a laboratory technician) may administer and/or verify that the courier 102 has ingested one or more materials 112 (identified as "Ingested Material(s)" in FIG. 1) at a first time 114 (identified as "Time T0" in FIG. 1) at the first location 106. The facilitator 110 may utilize a facilitator device 120 to input courier information 122, ingested material information 124, and an ingestion time 126 (e.g., the first time 114). FIG. 1 illustrates that courier-specific metabolic information 128 may include a baseline metabolic profile for particular ingested material(s). As described further herein with respect to FIG. 2, the courier-specific metabolic information 128 may include expected biological measurements for the courier 102 over time. Based on the particular ingested material(s) 112 and the courier-specific metabolic information 128, the facilitator device 120 may generate one or more expected biological sample values 130 for the courier 102. As described above, the expected biological sample value(s) 130 may include an expected concentration of the ingested material(s) 112, an expected concentration of metabolite(s) of the ingested material(s) 112, or a combination thereof.

In the example illustrated in FIG. 1, the computing device 104 includes a memory 140, a biological sample measurement component 142 (identified as "Lab-on-Chip Device" in FIG. 1), and at least one control component (illustrated in FIG. 1 as an enable logic component 144 and a disable logic component 146). While FIG. 1 illustrates individual components of the computing device 104 as separate blocks, in other cases multiple components may be integrated into a single component. As an example, the enable logic component 144 and/or the disable logic component 146 may be stored in the memory 140. As another example, the lab-on-chip device 142 may include the enable logic component 144 and the disable logic component 146 (and optionally the memory 140). Further, the computing device 104 may include additional hardware components (e.g., a processor) and/or software components that are not shown in the example illustrated in FIG. 1. The computing device 104 is configured to receive the expected biological sample value(s) 130 from the facilitator device 120 and to store the value(s) 130 in the memory 140.

In the illustrative example of FIG. 1, the computing device 104 is transported from the first location 106 to the second location 108. In some cases, the courier 102 may transport the computing device 104 (e.g., a "blade" server or other hardware component). In other cases, the computing device 104 and the courier 102 may travel separately to the second location 108. Further, while FIG. 1 illustrates one example in which the computing device 104 travels from the first location 106 to the second location 108, in other cases the computing device 104 may be shipped or otherwise transported from another location to the second location 108. To illustrate, while not shown in the example of FIG. 1, the expected biological sample value(s) 130 (or the baseline metabolic profile for the courier 102) may be communicated from the facilitator device 120 to the computing device 104 via a secure network.

FIG. 1 illustrates that the courier 102 may interact with the computing device 104 at the second location 108 at a second time 150 (identified as "T$_N$" in FIG. 1). In cases where the courier 102 transports the computing device 104 from the first location 106 to the second location 108, the courier 102 and the computing device 104 may arrive at the second location 108 at the same time (e.g., the second time 150). In cases where the computing device 104 is shipped or otherwise transported to the second location 108 by one or more individuals other than the courier 102, the courier 102 and the computing device 104 may arrive at different times. In either case, the computing device 104 receives information regarding a biological sample value that is expected to be measured for the courier 102 at the second time 150.

FIG. 1 illustrates that the computing device 104 may be a blade server to be installed at the second location 108 (e.g., a secure location, such as a data center, a military facility, a vehicle, etc.). In this example, the computing device 104 is to be inserted into a server rack 152 for operation at the second location 108. In other examples, the computing device 104 may include one or more other hardware and/or software components (e.g., spare parts, etc.) to be operated at the second location 108. To verify that an individual that attempts to access/operate the computing device 104 at the second location 108 is the courier 102, a biological sample 154 (or multiple biological samples) may be submitted for analysis. In the example illustrated in FIG. 1, the computing device 104 includes the lab-on-chip device 142 to receive the biological sample 154 for analysis. In other cases, a second facilitator at the second location 108 (not shown in FIG. 1) may receive the biological sample 154 and submit the biological sample 154 for analysis and comparison to an expected biological sample value for the courier 102.

In the example of FIG. 1, the lab-on-chip device 142 is disposed within or otherwise communicatively coupled to the computing device 104. The lab-on-chip device 142 is configured to analyze the biological sample 154 to generate a measured biological sample value at the second time 150 for comparison to the expected biological sample value(s) 130 stored in the memory 140. Different sets of operations may be performed based on a result of the comparison. For example, the enable logic component 144 may be configured to enable the courier 102 to operate the computing device 104 when the result of the comparison indicates that the measured biological sample value is associated with the courier 102 (e.g., a match within an allowed error margin). In some cases, the courier 102 may be transporting sensitive information to be provided to the computing device 104, and the enable logic component 144 may allow the courier 102 to operate the computing device 104 in order to access the sensitive information. As an example, one or more hardware and/or software operations may be disabled at the computing device 104, and the courier 102 may be transporting information to enable the hardware and/or software operations. Alternatively or additionally, particular data (e.g., sensitive data) may be stored in the memory 140 of the computing device 104, and the enable logic component 144 may be configured to enable access to the data upon verification of the identity of the courier 102.

As another example, the disable logic component 146 may be configured to disable access to the computing device 104 when the result of the comparison indicates that the measured biological sample value is different from the expected biological sample value 130. In some cases, particular data (e.g., sensitive data) may be stored in the memory 140 of the computing device 104, and the disable logic component 146 may be configured to disable access to the sensitive data stored in the memory 140. In other cases, the disable logic component 146 may be configured to remove/erase the sensitive data from the memory 140. As a further example, the disable logic component 146 may be configured to disable access to another computing device (e.g., a second computing device in the server rack 152), to disable access to sensitive data stored at another computing device, or to remove/erase sensitive data stored at another computing device.

It will be appreciated that various sets of operations may be performed depending on a sensitivity level of data stored in the memory 140 of the computing device 104 and/or a sensitivity level of other data stored in other computing devices at the second location 108 (e.g., in the server rack 152), among other alternatives. Further, while not illustrated in FIG. 1, other security component(s) may be utilized at the second location 108 for additional layer(s) of identity verification. As illustrative, non-limiting examples, a biometric security device (e.g., a fingerprint reader, a retinal scanner, etc.), a pulse oximeter, a hardware security device (e.g., a badge, a key fob, etc.), or a combination thereof may be utilized as additional identity verification component(s).

In operation, FIG. 1 illustrates a particular embodiment in which a "baseline" metabolic profile is determined for the courier 102 before administration of the material(s) 112 to the courier 102. As different individuals may process different materials at different rates, the metabolic profile may represent a courier-specific rate at which particular material(s) are biologically processed by the courier 102. In the present disclosure, the baseline metabolic profile for the courier 102 is used for subsequent identity verification operations. As described further herein with respect to FIG. 2, the concentration values that are measured for the courier 102 over a particular period of time after ingestion of the material(s) 112 may be used to generate the baseline metabolic profile that represents a "metabolic fingerprint" for the courier 102 for identity verification purposes.

As an illustrative example, in order to determine a baseline metabolic profile for the courier 102, the courier 102 may ingest a particular material (or a combination of multiple materials), such as glucose or asparagusic acid, among other alternatives. In this example, a blood analysis component may be used to dynamically monitor a concentration of glucose and/or asparagusic acid over a particular time period following ingestion. As another example, the courier 102 may submit urine/blood/breath samples at various times, and baseline metabolic profile values for various times may be estimated based on the sample values and the sample collection times. In some cases, the baseline metabolic profile for the courier 102 may be determined based on "normal" activity levels that may be expected for the courier 102 (e.g., during an expected travel time from the first location 106 to the second location 108).

The courier 102 may be instructed to observe a particular travel protocol when travelling to the second location 108. As an example, the baseline metabolic profile for the courier 102 may include measured biological sample values for the courier 102 when the courier 102 is fasting. To illustrate, in order to generate the baseline metabolic profile, the courier 102 may be instructed to consume no food or drink for a particular period of time (e.g., 12 hours) prior to the baseline metabolic profile testing. When the baseline metabolic profile is being determined for the courier 102, the courier 102 may consume no food or drink for a particular period of time after the material(s) 112 are administered. The fasting period may be a period of time that is expected to be sufficient to allow the courier 102 to travel to the second location 108 and to submit the biological sample 154. In this example, the courier 102 may be instructed to observe the same protocol while travelling as the courier 102 followed during generation of the baseline metabolic profile (e.g., no food or drink after administration of the material(s) 112) until the courier 102 provides the biological sample 154. It will be appreciated that alternative methods of generating baseline metabolic profile(s) and/or travel protocol(s) may be used to reduce a likelihood that a measured biological sample value for the courier 102 significantly varies from an expected biological sample value for the courier 102.

Alternatively or additionally, the ingested material(s) 112 may include one or more materials that may represent "abnormal" materials that would not typically be detected in human biological samples. As an example, the ingested material(s) 112 may include EPO or a medical radioisotope. In some cases, such materials may reduce complexity associated with identity verification for the courier 102. To illustrate, when the ingested material(s) 112 include a single "abnormal" material, such as EPO, the expected biological sample value 130 may identify EPO, while expected concentration value(s) of EPO for the courier 102 may be optional. While the use of such a binary test for an "abnormal" material may provide benefits in terms of reduced complexity, the reduced complexity may increase risk associated with an unauthorized individual attempting to "spoof" the identity of the courier 102. Accordingly, in some cases, the ingested material(s) 112 may represent a metabolic "cocktail" that may include multiple materials in order to reduce a likelihood of an unauthorized individual being able to successfully "spoof" the identity of the courier 102. An example of a metabolic "cocktail" may include at least one "normal" material (e.g., glucose, asparagusic acid, etc.) with associated courier-specific metabolic information 128 and at least one "abnormal" material (e.g., a medical radioisotope, EPO, etc.). Another example of a metabolic "cocktail" may include a combination of multiple "normal" materials with associated courier-specific metabolic information 128 that may represent an uncommon set of materials to be detected in a biological sample.

Figure 2:
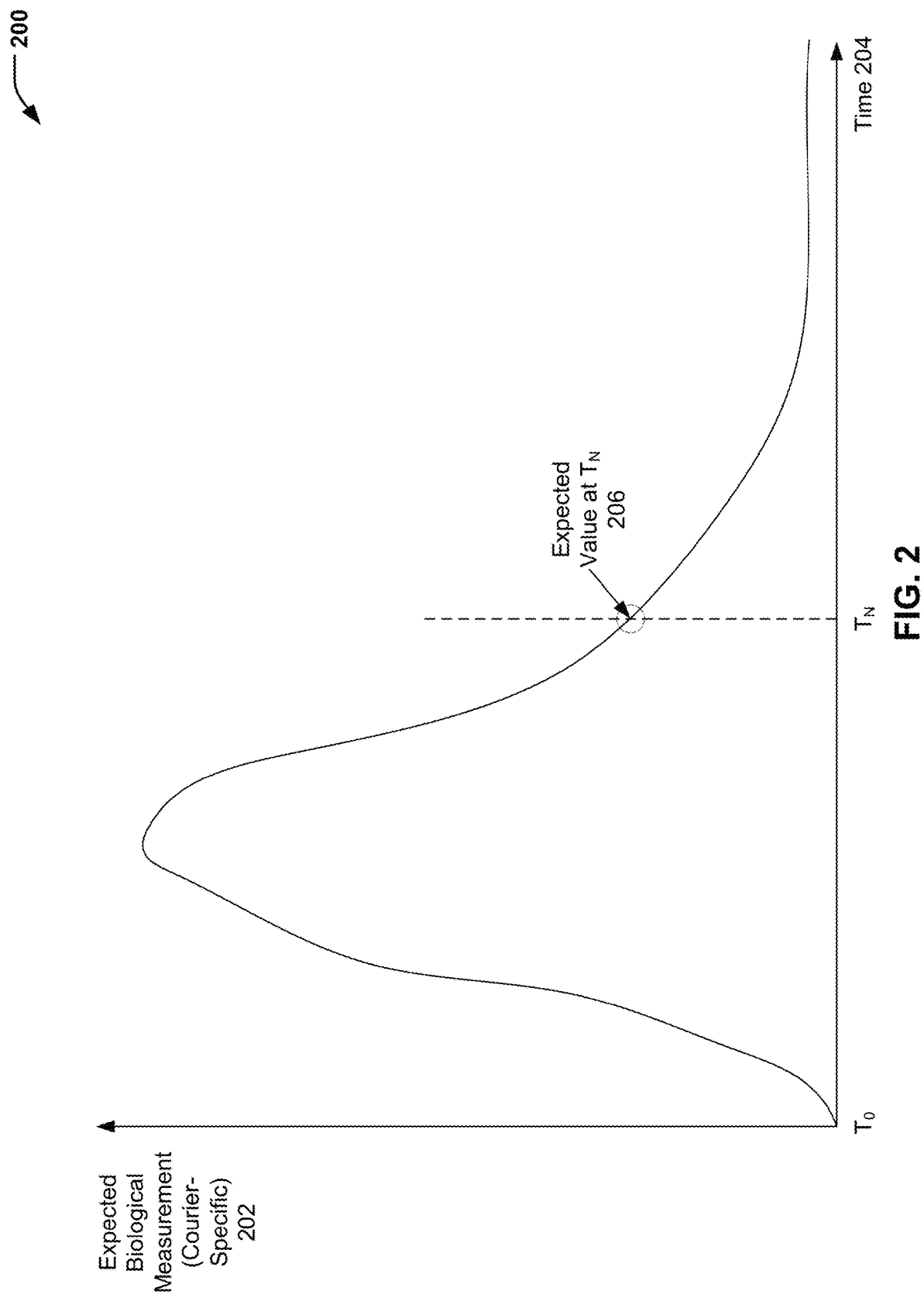
FIG. 2 is a diagram illustrating an example of expected (courier-specific) biological measurement values over time for use in identity verification, according to a particular embodiment.

The courier 102 ingests the material(s) 112 at the first time 114 (time $T_0$). The facilitator 110 provides the courier information 122, the ingested material information 124, and the ingestion time 126 to the facilitator device 120. In cases where the ingested material(s) 112 include at least one material with courier-specific metabolic information 128, the expected biological sample value(s) 130 that are generated by the facilitator device 120 may include multiple expected concentrations at multiple times after the ingestion time 126 (as illustrated in the example of FIG. 2). The expected biological sample value(s) 130 are stored in the memory 140 of the computing device 104. While FIG. 1 illustrates the computing device 104 as being located at the first location 106 at the time of ingestion of the material(s) 112, it will be appreciated that the computing device 104 may be located at another location (including the second location 108 or a third location that is not shown in FIG. 1).

The courier 102 departs for the second location 108 after ingesting the material(s) 112. As explained above, the courier 102 observes a particular travel protocol until the courier 102 provides the biological sample 154 at the second location 108. In a particular example, multiple "layers" of identity verification techniques may be utilized to verify the identity of the courier 102 at the second location 108. For example, while not shown in the example of FIG. 1, a biometric security device (e.g., a fingerprint scanner or retinal imager) may represent a first layer of identity verification for the courier 102, an oximeter (e.g., to verify that the individual submitting the biological sample 154 is alive) may represent a second layer of identity verification for the courier 102, and the lab-on-chip device 142 may represent a third layer of identity verification for the courier 102. Sensitive data (e.g., data stored at the memory 140 of the computing device 104) may be secure until the identity of the courier 102 is verified using each layer of security. Once the identity of the courier 102 is verified, the sensitive data can be downloaded via use of an appropriate algorithm.

As an illustrative, non-limiting example, when the computing device 104 is a blade server (as shown in the example of FIG. 1), the courier 102 may insert the computing device 104 into the server rack 152 and power on the computing device 104. In some cases, powering on the computing device 104 may activate the lab-on-chip device 142. The courier 102 may submit the biological sample 154 for analysis by the lab-on-chip device 142. The lab-on-chip device 142 determines a measured biological sample value (or multiple values) based on the biological sample 154 that is submitted and compares the measured biological sample value(s) to the expected biological sample value(s) 130 that may be stored in the memory 140 of the computing device 104. If the lab-on-chip device 142 determines that the results match (e.g., within an allowed error margin), the lab-on-chip device 142 may provide a first signal to the enable logic component 144. Responsive to the first signal, the enable logic component 144 may perform a first set of operations. For example, the enable logic component 144 may enable access to sensitive data that is stored at the memory 140 of the computing device 104 (among other alternative operations). If the lab-on-chip device 142 determines that the results do not match (e.g., within the allowed error margin), the lab-on-chip device 142 may provide a second signal to the disable logic component 146. Responsive to the second signal, the disable logic component 146 may perform a second set of operations. For example, the disable logic component 146 may disable access to sensitive data that is stored at the memory 140 of the computing device 104. As another example, the disable logic component 146 may disable the computing device 104, remove/erase the sensitive data from the memory 140 of the computing device 104, or a combination thereof (among other alternative operations).

Thus, FIG. 1 illustrates an example of providing additional layer(s) of security when transporting sensitive hardware and/or sensitive data to a destination location (e.g., a secure location). Additional layer(s) of security may be appropriate in various contexts. For example, in the event that an electronic device with sensitive hardware components and/or sensitive data (e.g., commercial, industrial, or military devices) is intentionally or inadvertently obtained by an unauthorized party, the unauthorized party may have access to sensitive information. In the particular embodiment illustrated in FIG. 1, an additional layer of security may be provided by verifying an identity of a courier at a destination location by comparing a measured biological sample value to a biological sample value that is expected to be measured for the courier based on a metabolic profile of the courier.

FIG. 2 is a diagram 200 illustrating examples of expected (courier-specific) biological measurement values over time for use in identity verification. In some cases, the expected courier-specific biological measurement values of FIG. 2 may correspond to the expected biological sample value(s) 130 for the courier 102 of FIG. 1. To illustrate, the expected values illustrated in FIG. 2 may be stored in the memory 140 of the computing device 104 of FIG. 1 for identity verification of the courier 102 at the second location 108.

In the particular embodiment illustrated in FIG. 2, an expected (courier-specific) biological measurement value 202 is illustrated on a Y axis, and time 204 is illustrated on an X axis. It will be appreciated that the graphical representation of FIG. 2 is for illustrated purposes and that the expected biological sample value(s) 130 that are stored in the memory 140 of the computing device 104 may not be stored in a graphical format. In FIG. 2, an expected courier-specific biological measurement value 206 at time $T_N$ (e.g., the second time 150 of FIG. 1) is illustrated. FIG. 2 further illustrates that, in some cases, a margin of error may be allowed for the expected value 206 (as shown by the circular range) to be considered a match for a measured value (e.g., a measured value associated with the biological sample 154).

Thus, FIG. 2 illustrates that an expected biological sample value (or multiple values) for a particular courier at a particular rate that may represent a courier-specific "metabolic fingerprint" for identity verification purposes. To illustrate, the values illustrated as a function of time in FIG. 2 may correspond to the expected biological sample value(s) 130 for the courier 102 of FIG. 1. As the expected biological sample value(s) 130 for the courier 102 are stored in the memory 140 of the computing device 104, a measured biological sample value based on the biological sample 154 that is submitted at a particular time (e.g., the second time 150) may be compared to a value that is expected at the particular time (e.g., the expected value 206 illustrated in FIG. 2).

Figure 3:
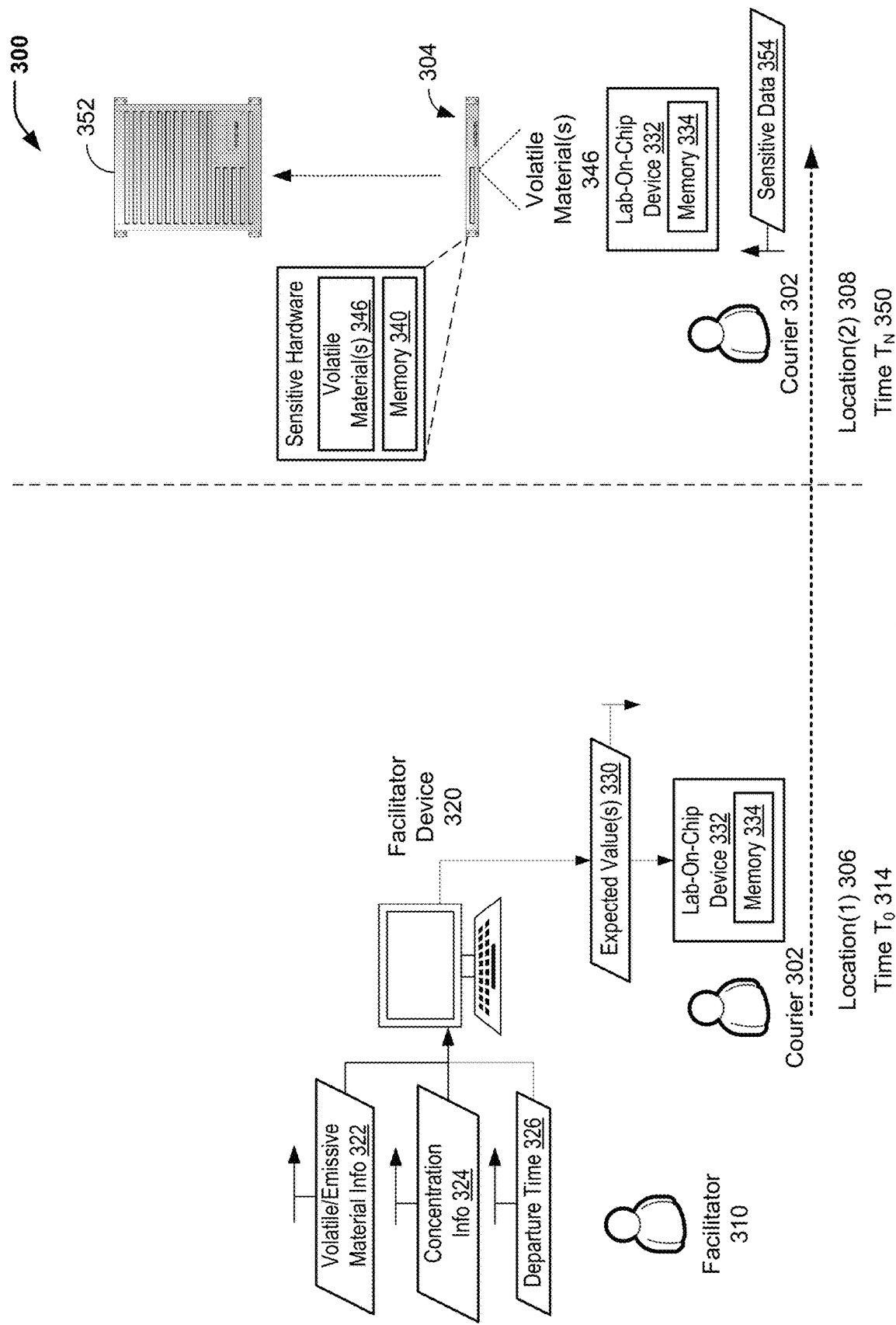
FIG. 3 is a block diagram illustrating an example of a system of identity verification based on a comparison of a measured value (e.g., a measured volatile material concentration value) to an expected value (e.g., a volatile material concentration value that is expected to be measured when located within a particular range of a computing device), according to a particular embodiment.

FIG. 3 is a block diagram that illustrates a particular embodiment of a system 300 of hardware device identity verification based on a comparison of a measured volatile material concentration value to a volatile material concentration value that is expected to be measured within a particular range of a computing device. In FIG. 3, a computing device 304 (identified as "Sensitive Hardware" in FIG. 3) is configured to control an off-gassing rate of one or more volatile materials. A courier 302 may transport a measurement device (e.g., a lab-on-chip device 332 to compare a measured value (e.g., a measured volatile material concentration value) to a value (e.g., a volatile material concentration value) that is expected to be measured when the lab-on-chip device 332 is located within a particular range of the computing device 304. While FIG. 3 illustrates an example of using volatile material(s), such as one or more VOCs, for hardware identity verification, it will be appreciated that alternative/additional material(s) such as alpha particle emitter(s) used for nuclear medicine may be used. The identity of the computing device 304 may be verified based on a result of the comparison. As described further herein with respect to FIG. 4, volatile material concentration values that are expected to be measured over time for the computing device 304 may be stored at a memory 334 of the lab-on-chip device 332 of the courier 302 for hardware device verification (or at another memory of another device).

In the particular embodiment illustrated in FIG. 3, the computing device 304 (e.g., a blade server) is transported to a second location 308 (identified as "Location(2)" in FIG. 3) for installation. In some cases, the computing device 304 may be transported from a first location 306 (identified as "Location(1)" in FIG. 3) to the second location 308. In other cases, the computing device 304 may be transported to the second location 308 from a third location that is different from the first location 306. In the example of FIG. 3, a facilitator 310 utilizes a facilitator device 320 to input volatile material information 322, concentration information 324, and departure time information 326 for the courier 302

(e.g., a first time 314, identified as "Time T0" in FIG. 3). Based on the volatile material information 322 and the concentration information 324, the facilitator device 320 may generate one or more expected volatile material concentration values 330 to be stored in the memory 334 of the lab-on-chip device 332 to be transported by the courier 302 from the first location 306 to the second location 308. Alternatively, while not shown in the example of FIG. 3, the one or more expected volatile material concentration values 330 may be sent to a device at the second location 308 (e.g., via a secure network) for use by the courier 302 in verifying the identity of the computing device 304.

In the example illustrated in FIG. 3, the computing device 304 includes a memory 340 and a volatile material 346 (or multiple volatile materials). In a particular embodiment, the volatile material 346 may include a volatile organic compound (VOC) or multiple VOCs. Illustrative, non-limiting examples of VOCs include formaldehyde, d-Limonene, toluene, acetone, ethanol (ethyl alcohol), 2-propanol (isopropyl alcohol), hexanol, or a combination thereof, among other alternatives. In the particular embodiment illustrated in FIG. 3, the volatile material 346 is disposed within a housing of the computing device 304. Alternatively, the volatile material 346 may be stored separately from the computing device 304 at the second location 308 (e.g., in a gas cylinder). To illustrate, while not shown in the example of FIG. 3, the computing device 304 may further include flow control logic that is communicatively coupled to a flow regulator (not shown) to control a flow rate (e.g., an "outgassing" rate) of volatile material 346 (e.g., an inert gas, such as a noble gas, or a mixture of various gases, among other alternatives). In this case, the flow control logic may control a flow rate of the volatile material 346 such that a measured volatile material concentration value within a particular range of the computing device 304 matches the expected volatile material concentration value(s) 330 that are provided to the volatile material measurement component 332 that is transported by the courier 302. As an illustrative, non-limiting example, the courier 302 may be instructed to position the lab-on-chip device 332 at an exhaust port of a regulator (not shown) to ensure that the "particular range" is satisfied for measurement purposes. It will be appreciated that the computing device 304 may include additional hardware components (e.g., a processor) and/or software components that are not shown in the example illustrated in FIG. 3.

The computing device 304 is configured to receive the departure time 326 from the facilitator device 320 and to store the departure time 326 in the memory 340. In some cases, the computing device 304 (e.g., a "blade" server or other hardware component) and the courier 302 may travel separately to the second location 308. In some cases, the computing device 304 may be transported from the first location 306 to the second location 308. In this case, the departure time 326 may be communicated from the facilitator device 320 to the computing device 304 for storage in the memory 340 before the computing device 304 is transported from the first location 306 to the second location 308.

FIG. 3 illustrates that the courier 302 may interact with the computing device 304 at the second location 308 at a second time 350 (identified as "$T_N$" in FIG. 1). FIG. 3 illustrates that the computing device 304 may be a blade server to be installed at the second location 308 (e.g., a secure location, such as a data center, a military facility, a vehicle, etc.). In this example, the computing device 304 is to be inserted into a server rack 352 for operation at the second location 308. In other examples, the computing device 304 may include one or more other hardware and/or software components (e.g., spare parts, etc.) to be operated at the second location 308. For hardware identity verification, the lab-on-chip device 332 transported by the courier 302 to the second location 308 is used to measure a volatile material concentration value within a particular range of the computing device 304. In the example of FIG. 3, the lab-on-chip device 332 is configured to generate a measured volatile material concentration value at the second time 350 for comparison to the expected volatile material concentration value(s) 330 stored in the memory 334 of the lab-on-chip device 332.

FIG. 3 illustrates that, in some cases, the courier 302 may be transporting sensitive information to be provided to the computing device 304. The lab-on-chip device 332 may be configured to provide an indication (e.g., audible, visual, or tactile feedback) to the courier 302 in order to indicate to the courier 302 a result of the comparison. Thus, in some cases, the lab-on-chip device 332 may be used by the courier 302 for hardware identity verification before the courier 302 provides the sensitive information. In some cases, the sensitive information may be stored in the memory 334 of the lab-on-chip device 332. In other cases, as illustrated in the example of FIG. 3, the courier 302 may provide sensitive data 354 to the computing device 304 (e.g., via a keyboard or other input device that is not shown in FIG. 3). Thus, FIG. 3 illustrates an example in which the measured volatile material concentration value at the second time 350 matches the material concentration value 330 that is expected to be measured at the second time 350 (within a particular range of the computing device 304).

In some cases, the courier 302 may determine, based on a result of the comparison indicating an unexpected volatile material concentration value, that the sensitive data 354 should not be provided. In cases where the sensitive data 354 is stored in the memory 334 of the lab-on-chip device 332, the sensitive data 354 may be (automatically) rendered inaccessible or may be (automatically) removed/deleted from the memory 334 when the measured volatile material concentration represents an unexpected material and/or concentration (e.g., via logic stored at the lab-on-chip device 332, not shown in FIG. 3). Further, while not illustrated in the example of FIG. 3, in the event that the sensitive data 354 is pre-loaded into the memory 340 of the computing device 304 (e.g., prior to being transported to the second location 308), the sensitive data 354 may be (automatically) rendered inaccessible or may be (automatically) removed/deleted from the memory 340 when the measured volatile material concentration represents an unexpected material and/or concentration (e.g., via logic stored at the lab-on-chip device 332, not shown in FIG. 3).

It will be appreciated that various sets of operations may be performed depending on a sensitivity of particular data (e.g., the sensitive data 354) and/or a sensitivity of other data stored in other computing devices at the second location 308 (e.g., in the server rack 352), among other alternatives. Further, while not illustrated in FIG. 3, other security component(s) may be utilized at the second location 308 for additional layer(s) of identity verification. As illustrative, non-limiting examples, a biometric security device (e.g., a fingerprint reader, a retinal scanner, etc.), a pulse oximeter, a hardware security device (e.g., a badge, a key fob, etc.), or a combination thereof may be utilized as additional identity verification component(s).

Thus, FIG. 3 illustrates another example of providing additional layer(s) of security when transporting sensitive hardware and/or sensitive data to a destination location (e.g., a secure location). In the particular embodiment illustrated in FIG. 3, hardware security may be enhanced by comparing a measured volatile material concentration value to a volatile material concentration value that is expected to be measured within a particular range of a computing device that is configured to off-gas the volatile material. While not shown in the examples of FIG. 1 and FIG. 3, it will be appreciated that a combination of the two verification methods may be utilized in some embodiments (for added security). To illustrate, the courier identity verification illustrated in FIG. 1 may be combined with the hardware verification illustrated in FIG. 3. Thus, the present disclosure contemplates enhanced security based on a "metabolic fingerprint" of a courier as well as enhanced security based on a "volatile material fingerprint" of a computing device.

FIG. 4 is a diagram 400 illustrating examples of expected volatile material concentration values over time for use in hardware identity verification. In some cases, the expected volatile material concentration values of FIG. 4 may correspond to the expected volatile material concentration value(s) 330 of FIG. 3. To illustrate, the expected values illustrated in FIG. 4 may be stored at the volatile material measurement component 332 (e.g., the lab-on-chip device) of FIG. 3 for hardware identity verification of the computing device 304 at the second location 308.

In the particular embodiment illustrated in FIG. 4, an expected volatile material concentration value 402 is illustrated on a Y axis, and time 404 is illustrated on an X axis. It will be appreciated that the graphical representation of FIG. 4 is for illustrated purposes and that the expected volatile material concentration value(s) 330 that are stored at the volatile material measurement component 332 (e.g., the lab-on-chip device) of FIG. 3 may not be stored in a graphical format. In FIG. 4, an expected volatile material concentration value 406 at time $T_N$ (e.g., the second time 350 of FIG. 3) is illustrated. FIG. 4 further illustrates that, in some cases, a margin of error may be allowed for the expected value 406 (as shown by the circular range) to be considered a match for a measured value (e.g., a volatile material concentration value that is measured within a particular range of the computing device 304).

Thus, FIG. 4 illustrates that an expected volatile material concentration value for a particular computing device that is programmed to off-gas a volatile material (or multiple materials) at a particular rate may represent a device-specific "volatile material fingerprint" for hardware identification purposes. To illustrate, the values illustrated as a function of time in FIG. 4 may correspond to the expected volatile material concentration value(s) 330 for the computing device 304 of FIG. 3. The expected volatile material concentration value(s) 330 for the computing device 304 are stored at a volatile material measurement component 332 (e.g., a lab-on-chip device) that is transported by the courier 302. As such, a measured volatile material concentration value that is measured by the lab-on-chip device of the courier 302 at a particular time (e.g., the second time 350) may be compared to a value that is expected at the particular time (e.g., the expected value 406 illustrated in FIG. 4).

FIG. 5 is a flow diagram that illustrates a particular embodiment of a method 500 of identity verification based on a comparison of a measured biological sample value to a biological sample value that is expected to be measured for a courier. FIG. 5 illustrates an example of providing an additional layer of security for an electronic device with sensitive hardware components and/or sensitive data (e.g., commercial, industrial, or military devices). In FIG. 5, the additional layer of security includes verifying an identity of a courier at a destination location by comparing a measured biological sample value to a biological sample value that is expected to be measured for the courier based on a metabolic profile of the courier.

The method 500 includes identifying a courier, at 502. For example, referring to FIG. 1, the facilitator 110 may identify the courier 102, and the facilitator 110 may provide the courier information 122 via the facilitator device 120. In other cases, one or more biometric identification devices may be used to verify the identity of the courier 102. The method 500 includes administering a "metabolic cocktail" to the courier, at 504. For example, referring to FIG. 1, the facilitator 110 may administer the material(s) 112 to the courier 102 (e.g., via ingestion, absorption, or inhalation). The facilitator 120 provides the ingested material information 124 and the ingestion time 126 via the facilitator device 120, and the facilitator device 120 determines the expected biological sample value(s) 130 for the courier 102 based on the courier-specific metabolic information 128 (e.g., a predetermined baseline metabolic profile for the courier 102 as previously described). FIG. 1 illustrates that the expected biological sample value(s) 130 for the courier 102 may be stored in the memory 140 of the computing device 104.

At 506, the courier travels from the first location to a second location (e.g., a secure location, such as a hardware installation site). For example, referring to FIG. 1, the courier 102 travels from the first location 106 (after ingesting the material(s) 112 at the first time 114) to the second location 108. At 508, the courier powers on operating hardware, and a lab-on-chip device on the operating hardware is initiated. For example, referring to FIG. 1, the courier 102 may power on the computing device 104, and the lab-on-chip device 142 of the computing device 104 is initiated.

At 510, the lab-on-chip device compares an expected metabolic concentration based on time in transit to that in the courier. For example, referring to FIG. 1, the lab-on-chip device 142 of the computing device 104 receives the biological sample 154 (at approximately the second time 150), determines a measured biological sample value based on the biological sample 154, and compares the measured biological sample value to the expected biological sample value(s) 130 stored in the memory 140. As further described herein with respect to FIG. 2, the value 206 (at time $T_N$) may represent a value that is expected for the courier 102 at the second time 150.

FIG. 5 illustrates that the method 500 includes performing a first set of operations (e.g., enabling the system) when the metabolic concentration is as expected, at 512. For example, referring to FIG. 1, the lab-on-chip device 142 of the computing device 104 may send a first signal to the enable logic component 144 to provide an indication that the measured biological sample value represents a match for an expected biological sample value for the courier 102. As described further herein, the enable logic component 144 may perform a first set of operations in response to receiving the first signal from the lab-on-chip device 142. As an illustrative example, the enable logic component 144 may provide access to particular data (e.g., sensitive data) that is stored in the memory 140 of the computing device 104, among other alternative/additional operations.

FIG. 5 illustrates that the method 500 includes performing a second set of operations (e.g., disabling the system, erasing sensitive data, etc.) when the metabolic concentration is not as expected, at 514. For example, referring to FIG. 1, the lab-on-chip device 142 of the computing device 104 may send a second signal to the disable logic component 146 to provide an indication that the measured biological sample value does not represent a match for an expected biological sample value for the courier 102. As described further herein, the disable logic component 146 may perform a second set of operations in response to receiving the second signal from the lab-on-chip device 142. In the particular embodiment illustrated in FIG. 5, the method 500 further includes erasing sensitive data when the metabolic concentration is not as expected. In alternative embodiments, the disable logic component 146 may perform one or more alternative and/or additional operations.

Thus, FIG. 5 illustrates that an additional layer of security may be provided by verifying an identity of a courier at a destination location by comparing a measured biological sample value to a biological sample value that is expected to be measured for the courier based on a metabolic profile of the courier. In the event that an electronic device with sensitive hardware components and/or sensitive data (e.g., commercial, industrial, or military devices) is intentionally or inadvertently obtained by an unauthorized party, the additional layer of security associated with courier identity verification may reduce a likelihood of an unauthorized party being able to access sensitive information.

FIG. 6 is a flow diagram that illustrates a particular embodiment of a method 600 of identity verification based on a comparison of a measured volatile material concentration value to a volatile material concentration value that is expected to be measured within a particular range of a computing device. FIG. 6 illustrates an example of providing an additional layer of security when transporting sensitive hardware and/or sensitive data to a destination location (e.g., a secure location). In FIG. 6, the additional layer of security is provided by a lab-on-chip device (or other volatile material measurement component) that is transported by a courier. An identity of a computing device may be verified based on a result of a comparison (by the lab-on-chip device) of a measured volatile material concentration value to a volatile material concentration value that is expected to be measured within a particular range of the computing device.

The method 600 includes providing a lab-on-chip device to a courier, at 602. For example, referring to FIG. 3, the facilitator 310 may provide the lab-on-chip device 332 to the courier 302. As shown in FIG. 3, the facilitator 310 may provide the volatile material information 322, the concentration information 324, and the departure time 326 (e.g., Time To) via the facilitator device 320. The facilitator device 320 generates the expected volatile material concentration value(s) 330 that are stored at the memory 334 of the lab-on-chip device 332 prior to the courier 302 departing from the first location 306. Alternatively, the expected volatile material concentration value(s) 330 may be provided to a device at the second location 308 (e.g., via a secure network). In some cases, the computing device 304 may determine an off-gas rate based on the departure time 326. In other cases, the facilitator device 320 may communicate the expected volatile material concentration value(s) 330 to the computing device 304 (e.g., for use by flow control logic to adjust a regulator in order to off-gas the volatile material 346 at an expected concentration/rate).

At 604, the courier travels from a first location to a second location (e.g., a secure location, such as a hardware installation site). For example, referring to FIG. 3, the courier 302 travels from the first location 306 to the second location 308. At 606, the lab-on-chip device comes into range of operating hardware. For example, referring to FIG. 3, the courier 302 may position the lab-on-chip device 332 within the particular range of the computing device 304.

At 608, the lab-on-chip device measures a concentration of volatile material that is off-gassed by the operating hardware. For example, referring to FIG. 3, the lab-on-chip device 332 detects the volatile material 346 (at approximately the second time 350) and determines a measured volatile material concentration value of the volatile material 346. At 610, the lab-on-chip device compares a measured concentration of volatile material to an expected concentration of volatile material. For example, the lab-on-chip device 332 compares the measured volatile material concentration value to the expected volatile material concentration value(s) 330 stored in the memory 334. As further described herein with respect to FIG. 4, the value 406 (at time $T_N$) may represent a volatile material concentration value that the lab-on-chip device 332 is expected to measure at the second time 150 (when positioned within a particular range of the computing device 304).

FIG. 6 illustrates that the method 600 includes performing a first set of operations (e.g., enabling a system) when the volatile material concentration is as expected, at 612. For example, FIG. 3 illustrates that, in some cases, the courier 302 may be transporting sensitive information to be provided to the computing device 304. The lab-on-chip device 332 may provide an indication (e.g., audible, visual, or tactile feedback) to the courier 302 in order to indicate to the courier 302 that a result of the comparison indicates that the measured concentration is as expected. In some cases, the sensitive information may be stored in the memory 334 of the lab-on-chip device 332. In other cases, as illustrated in the example of FIG. 3, the courier 302 may provide sensitive data 354 to the computing device 304 (e.g., via a keyboard or other input device that is not shown in FIG. 3). The sensitive data 354 may represent a predetermined "access key" to be provided by the courier 302 in order to enable the computing device 304 for operation at the second location 308.

FIG. 6 illustrates that the method 600 includes performing a second set of operations (e.g., disabling the system, erasing sensitive data, etc.) when the volatile material concentration is not as expected, at 614. For example, referring to FIG. 3, the lab-on-chip device 332 may provide an indication (e.g., audible, visual, or tactile feedback) to the courier 302 in order to indicate to the courier 302 that the measured concentration does not match an expected concentration. In response, the courier 302 may refrain from providing the sensitive data 354. In the particular embodiment illustrated in FIG. 6, the method 600 further includes erasing sensitive data when the volatile material concentration is not as expected. To illustrate, in cases where the sensitive data 354 is stored in the memory 334 of the lab-on-chip device 332, the sensitive data 354 may be (automatically) rendered inaccessible or may be (automatically) removed/deleted from the memory 334. Further, while not illustrated in the example of FIG. 3, in the event that the sensitive data 354 is pre-loaded into the memory 340 of the computing device 304 (e.g., prior to being transported to the second location 308), the sensitive data 354 may be (automatically) rendered inaccessible or may be (automatically) removed/deleted from the memory 340 when the measured volatile material concentration represents an unexpected material and/or concentration.

Thus, FIG. 6 illustrates that hardware security may be enhanced by comparing a measured volatile material concentration value to a volatile material concentration value that is expected to be measured within a particular range of a computing device that is configured to off-gas the volatile material. In the event that sensitive hardware components and/or sensitive data (e.g., commercial, industrial, or military devices) is intentionally or inadvertently obtained by an unauthorized party, the additional layer of security associated with hardware device verification may reduce a likelihood of an unauthorized party being able to access sensitive information.

Referring to FIG. 7, an exemplary automated computing machinery including a computer 710 is shown. The computer 710 is an exemplary implementation of the computing device 104 of FIG. 1 or the computing device 304 of FIG. 3. The computer 710 includes at least one computer processor (CPU) 712 as well as main memory 714, a memory controller 716, and a non-volatile memory 718. The main memory 714 is connected through a memory bus 720 to the memory controller 716. The memory controller 720 and the non-volatile memory 714 are connected through a memory bus 722 and a bus adapter 724 to the processor 712 through a processor bus 726.

Stored at the memory 714 is an application 732 that may be a module of user-level computer program instructions for carrying out particular tasks (e.g., the control operations described with respect to the enable logic component 144 and the disable logic component 146 of FIG. 1, etc.). Also stored at the main memory 714 is an operating system 732. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 732 and the application 730 in the example of FIG. 7 are shown in the main memory 714, but components of the aforementioned software may also, or in addition, be stored at non-volatile memory (e.g., on data storage, such as illustrative data storage 740 and/or the non-volatile memory 718).

The computer 710 includes a disk drive adapter 742 coupled through an expansion bus 744 and the bus adapter 724 to the processor 712 and other components of the computer 710. The disk drive adapter 742 connects non-volatile data storage to the computer 710 in the form of the data storage 740 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art.

The computer 710 also includes one or more input/output ("I/O") adapters 746 that implement user-oriented input/output through, for example, software drivers and computer hardware for controlling input and output to and from user input devices 748, such as keyboards and mice. In addition, the computer 710 includes a communications adapter 750 for data communications with a data communications network 752. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 750 implements the hardware level of data communications through which one computer sends data communications to another computer, directly or through a data communications network. Examples of the communications adapter 750 suitable to use in the computer 710 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 710 also includes a display adapter 754 that facilitates data communication between the bus adapter 724 and a display device 756, enabling the application 730 to visually present output on the display device 756.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of identity verification, the method comprising:
   positioning a lab-on-chip device within a predetermined range of a computing device;
   off-gassing a volatile compound from the computing device to the lab-on-chip device, wherein the computing device is configured to control an off-gassing rate of the volatile compound;
   verifying the computing device at the lab-on-chip device using the off-gassed volatile compound off-gassed from the computing device;
   receiving an expected biological sample value at the computing device or the lab-on-chip device in response to the verification, wherein the expected biological sample value indicates an expected concentration of a material biologically processed by a courier;
   determining, at the computing device, whether a measured biological sample value is associated with the courier based on a comparison of the expected biological sample value to the measured biological sample value; and
   determining, at the computing device, a particular set of operations to be performed based on a result of the comparison.

2. The method of claim 1, wherein the expected biological sample value is determined based on a metabolic profile associated with the courier.

3. The method of claim 1, further comprising performing the set of operations based on the result of the comparison indicating that the measured biological sample value is associated with the courier.

4. The method of claim 3, wherein the set of operations includes providing the courier with access to particular data.

5. The method of claim 1, further comprising performing a second set of operations based on the result of the comparison indicating that the measured biological sample value is outside an acceptable range of the expected biological sample value.

6. The method of claim 5, wherein the second set of operations includes preventing access to particular data.

7. The method of claim 5, wherein the second set of operations includes deleting particular data.

8. The method of claim 1, wherein material is administered to the courier at a first time, and wherein the expected biological sample value indicates the expected concentration of the material at a second time.

9. The method of claim 8, wherein the material is administered to the courier at the first time at a first location, and wherein the measured biological sample value is measured at the second time at a second location.

10. The method of claim 8, wherein the measured biological sample value is measured at the second time by the lab-on-chip device.

11. The method of claim 8, wherein the material includes glucose, asparagusic acid, erythropoietin (EPO), a medical radioisotope, or a combination thereof.

12. The method of claim 1, wherein the measured biological sample value is determined by a blood analysis component, a urinalysis component, or a breathalyzer device.

13. The method of claim 1, wherein the volatile compound includes at least one of formaldehyde, d-Limonene, toluene, acetone, ethanol (ethyl alcohol), 2-propanol (isopropyl alcohol), and hexanol.

* * * * *